Oct. 7, 1958    I. RICKLESS    2,854,765
EDUCATIONAL DEVICE DESCRIPTIVE OF WEATHER CONDITIONS
Filed Nov. 2, 1955

INVENTOR.
IDA RICKLESS
BY
ATTORNEY

United States Patent Office 2,854,765
Patented Oct. 7, 1958

2,854,765

EDUCATIONAL DEVICE DESCRIPTIVE OF WEATHER CONDITIONS

Ida Rickless, Rochester, N. Y.

Application November 2, 1955, Serial No. 544,432

3 Claims. (Cl. 35—35)

The present invention relates generally to teaching devices and more particularly to a device for teaching children about the weather.

Young children, and particularly children of elementary school age, often take no notice of the weather. For their own welfare, and as an important part of their general education, it is desirable to make them conscious of, and observant of, weather conditions.

A primary object of this invention is to provide a device for teaching children about the weather.

Another object of this invention is to provide a weather teaching device having means for attracting a child's attention and requiring some, simple manual activity on the part of the child in order to use the device, thereby making the process of teaching a child about the weather in the nature of a game.

Another object of this invention is to provide a teaching device which will tend to develop a child's power of observation.

A further and concomitant object of this invention is to provide, in a device of the character described, means for teaching a child to read the names of the days of the week and general words which are descriptive of weather conditions.

A still further object of this invention is to provide a device of the character described which is inexpensive to manufacture by virtue of its simple construction.

Other objects of this invention will be apparent hereinafter from the specification and from the recital of the appended claims.

Figures 1, 2:
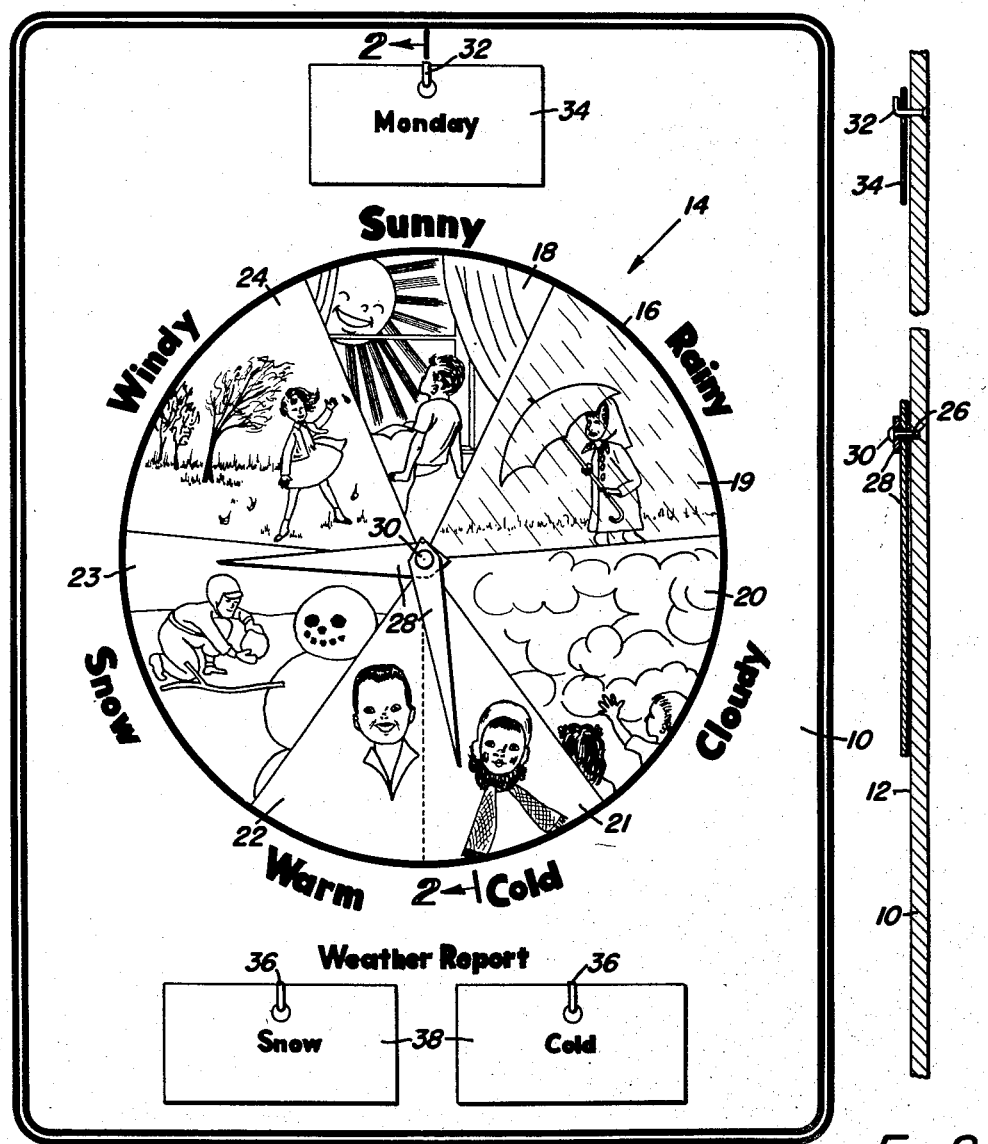
Fig. 1 is a front elevation of a device for teaching a child about the weather constructed according to one embodiment of my invention.
Fig. 2 is a fragmentary section taken on the line 2—2 of Fig. 1 and looking in the direction of the arrows.

Referring now to the drawing by numerals of reference, 10 indicates a flat, rectangularly shaped support which forms the backing member of the teaching device. Support 10 is preferably made of inexpensive fiberboard or the like. However, wood, metal, plastic or some other material may be used.

Support 10 has a front surface 12 on which a weather indicator dial 14 (Fig. 1) is printed. Indicator dial 14 comprises a circle 16 divided, in the example shown, into seven segments, denoted, respectively as 18, 19, 20, 21, 22, 23 and 24. Each segment bears a picture depicting a certain kind of weather. The type of weather depicted on each segment is different from the types of weather depicted on all of the other segments. Opposite each segment, and printed on the surface 12 of support 10, is a descriptive word referring to the weather pictured.

On the dial delineated, segment 18 bears the picture of a boy waking up in the morning and looking out of his bedroom window at the sun. Opposite segment 18 is the word "Sunny." Segment 19 shows a girl holding an umbrella and rain falling. Opposite segment 19 is the word "Rainy." Segment 20 shows a body and a girl looking skyward, the sky being filled with clouds. Opposite segment 20 is the word "Cloudy." Segment 21 has a picture of a girl wearing a woolen cap down over her ears and having a scarf or muffler boundled around her neck. Opposite segment 21 is the word "Cold." Segment 22 shows a smiling boy wearing a shirt open at the neck. Opposite segment 22 is the word "Warm." Segment 23 shows a snowman and a boy rolling a snowball. Opposite segment 23 is the word "Snow." Segment 24 pictures trees, leaves and a girl blown by the wind. Opposite segment 24 is the word "Windy."

Secured in the support 10 in the center of dial 14 is a pin 26 which projects upwardly. Mounted on pin 26 are two pointers, or hands, 28, similar to the hands of a clock except that both hands are the same size. Pointers 28 are manually movable on pin 26 so that they can be adjusted to point to any of the segments on the dial. The outer end 30 of pin 26 is flattened to hold the hands on the pin.

Figure 3:
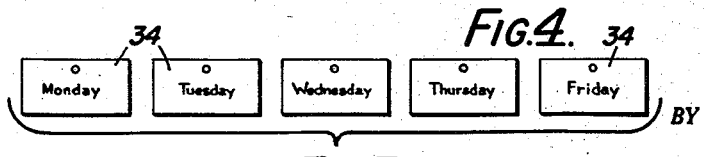
Fig. 3 is a front view of a series of "day" cards which are adapted to be mounted, selectively, on the device.

Riveted in support 10 above dial 14 and projecting outwardly of support 10 is a hook 32. Hook 32 is adapted to receive a card 34 bearing the name of a day of the week. Five cards are provided with the teaching device, each card bearing the name of one "school" day of the week. (See Fig. 3.) In the illustration, the card 34 on hook 32 bears the word "Monday."

Figure 4:
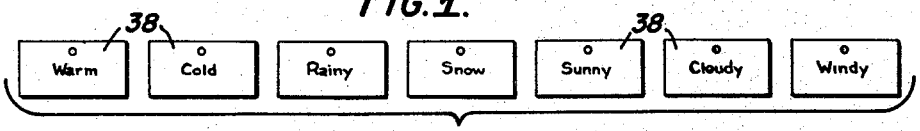
Fig. 4 is a front view of "weather description" cards also adapted to be mounted, selectively, on the device.

Below indicator dial 14 and also projecting outwardly of support 10 are two spaced hooks 36. Hooks 36 are each adapted to receive a card 38 bearing a word descriptive of the weather, indicated by the positions of the pointers 28 on the indicator. Seven cards are provided with the teaching device, each card bearing a word denoting one type of weather. (See Fig. 4.) The words on the cards correspond to the words printed on support 10 opposite the dial segments. In the drawing, the card mounted on one of the hooks 36 bears the word "Snow" and the card mounted on the other hook bears the word "Cold."

The teaching device is used in the following manner: If used in school, a pupil goes to the teaching aid each morning and positions the pointers or hands 28 in accordance with the weather outside. For example, if the weather is sunny and warm, the child will position one pointer over segment 18 and the other pointer over segment 22. If the weather is snowy and cold, the child will point one pointer opposite segment 23 and the other opposite segment 21, as shown. At the same time, the child will select a "day" card bearing the name of the particular day of the week and mount the card on hook 32. He or she will then select the cards descriptive of the weather and corresponding to the positions of pointers 28. Thus, if the pointers are on segments 21 and 23, indicating that the weather is cold and snowy, the child will pick cards 38 bearing the words "Cold" and "Snow" and mount them on hooks 36.

The teaching device just described makes a child weather-conscious. The illustrations in the various dial segments attract the child's attention and, since the device is operated in the nature of a game, requiring the movement of pointers 28 and the placement of cards 34 and 38, it develops a child's interest. Further, the use of the cards 34 and 38 will, in time, teach the child how to read the names of the days of the week and also how to read words indicative of the weather.

Although a rectangular support with a circular indicator dial has been shown, it will be obvious that such a structure is not vital to the applicant's inventive concept.

Support 10 could be dispensed with and a member shaped like a clock could be used. However, a support having an area greater than the area of the indicator is desirable since it provides a space on which word cards may be affixed. Further, while it is preferable to arrange the weather indicating pictures circularly, it is conceivable that they might be arranged in the form of a square, rectangle, or other shape; and hands or pointers which are slidable rectilinearly can then be used to indicate the types of weather illustrated on the blocks or segments of the board. Still further, while seven segments have been shown, the number can be varied at will in accordance with the number of different types of weather which it is desired to illustrate. Furthermore, the device is not limited to the particular illustrations shown. They are only examples of what may be used. Any kind of illustrations suggestive of different kinds of weather may be employed.

While the invention has been described in connection with a specific embodiment thereof, then, it will be understood that it is capable of further modification, and this invention is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. An educational device for teaching children about the weather comprising a support, a dial delineated on said support, said dial being divided into a plurality of sectors arranged about the center of the dial, each of said sectors bearing a picture fancifully suggesting a particular type of weather, the type of weather depicted by one sector being different from the types of weather depicted by the other sectors, a word printed on said support adjacent each of said sectors, appropriate to the weather depicted by the respective sector, a manually movable indicator mounted on said support for movement to point to the sector which bears a picture depicting the type of weather prevailing at the time, and means for removably supporting on said support selectively one of a plurality of cards, which have imprinted thereon, respectively, words describing, respectively, the several types of weather depicted in said pictures.

2. An educational device for teaching children about the weather comprising a support, a dial delineated on said support, said dial being divided into a plurality of sectors arranged about the center of the dial, each of said sectors bearing a picture fancifully suggesting a particular type of weather, the type of weather depicted by one sector being different from the type of weather depicted by the other sectors, a word printed on said support adjacent each of said sectors appropriate to the weather depicted by the respective sector, a manually movable indicator mounted on said support for movement to point to the sector which bears a picture depicting the type of weather prevailing at the time, a plurality of cards each of which bears a word which corresponds to the word adjacent one of said sectors, there being as many cards as there are sectors, means for removably mounting selectively one of said cards, at least, on said support, a set of cards, each of which bears the name of a day of the week, and means for removably mounting selectively one card of the last-named set of cards on said support.

3. An educational device for teaching children about the weather, comprising a board having a plurality of segments delineated thereon, each of said segments bearing a picture fancifully suggesting a particular weather condition, the pictures on the different segments depicting different weather conditions, respectively, a manually-movable indicator movably mounted on said board and adapted to be positioned selectively opposite one of said segments to indicate the prevailing weather condition, and means for removably supporting on said board selectively one of a plurality of cards which have imprinted thereon, respectively, words describing, respectively, the several weather conditions depicted in said pictures.

References Cited in the file of this patent

UNITED STATES PATENTS

| | | |
|---|---|---|
| 782,811 | Ames | Feb. 21, 1905 |
| 2,385,732 | Redding | Sept. 25, 1945 |
| 2,474,447 | Wheelock | June 28, 1949 |
| 2,508,273 | Krick | May 16, 1950 |
| 2,526,114 | Blewett | Oct. 17, 1950 |

FOREIGN PATENTS

| | | |
|---|---|---|
| 6,276 | Great Britain | Jan. 27, 1916 |